(12) United States Patent
Petrovic

(10) Patent No.: US 9,676,568 B2
(45) Date of Patent: Jun. 13, 2017

(54) DEVICE FOR TRANSFERRING PRE-FORMED LAYERS OF OBJECTS TO THE TOP OF A PALLET

(75) Inventor: Zmaj Petrovic, Octeville-sur-mer (FR)

(73) Assignee: GEBO PACKAGING SOLUTIONS ITALY S.R.L., Parma (IT)

( * ) Notice: Subject to any disclaimer, the term of this patent is extended or adjusted under 35 U.S.C. 154(b) by 98 days.

(21) Appl. No.: 14/344,564

(22) PCT Filed: Sep. 12, 2012

(86) PCT No.: PCT/FR2012/052031
§ 371 (c)(1),
(2), (4) Date: Mar. 12, 2014

(87) PCT Pub. No.: WO2013/038102
PCT Pub. Date: Mar. 21, 2013

(65) Prior Publication Data
US 2014/0294553 A1    Oct. 2, 2014

(30) Foreign Application Priority Data

Sep. 15, 2011 (FR) ...................... 11 58240

(51) Int. Cl.
| | |
|---|---|
| B65G 57/112 | (2006.01) |
| B65H 29/50 | (2006.01) |
| B65H 29/18 | (2006.01) |
| B65G 57/02 | (2006.01) |
| B65G 57/24 | (2006.01) |
| B65G 61/00 | (2006.01) |

(52) U.S. Cl.
CPC ............. *B65G 57/02* (2013.01); *B65G 57/24* (2013.01); *B65G 61/00* (2013.01)

(58) Field of Classification Search
CPC ........ B65G 57/02; B65G 57/24; B65G 61/00; B65B 35/50; B65B 35/52; B21B 39/002
USPC .................................. 53/447, 540; 414/794.6
See application file for complete search history.

(56) References Cited

U.S. PATENT DOCUMENTS

| | | | | |
|---|---|---|---|---|
| 2,875,908 A | * | 3/1959 | Woodcock ............. | B65G 57/24 414/793.5 |
| 3,195,737 A | * | 7/1965 | Melrose ................ | B21B 39/002 414/739 |
| 4,274,780 A | * | 6/1981 | Kaul .................... | B65G 57/245 198/457.02 |
| 4,439,084 A | * | 3/1984 | Werkheiser .......... | B65G 57/245 414/792 |

FOREIGN PATENT DOCUMENTS

| | | |
|---|---|---|
| EP | 1 457 442 A1 | 9/2004 |
| EP | 2 112 101 A1 | 10/2009 |
| IT | 941558 A1 | 1/1996 |
| JP | 58-139926 A | 8/1983 |
| WO | 2010/086292 A1 | 8/2010 |

* cited by examiner

*Primary Examiner* — Stephen Vu
(74) *Attorney, Agent, or Firm* — Sughrue Mion, PLLC

(57) ABSTRACT

A device for transferring pre-formed layers of objects to the top of a pallet. The device has a guide column (2), a depositing head (4) designed to deposit the layers (11) on top of one another on the pallet (6), and a receiving tray (3) for receiving a pre-formed layer of objects. The receiving tray (3) is movable relative to the depositing head (4). The depositing head (4) and the receiving tray (3) is each slidably mounted in cantilever fashion on the guide column (2).

17 Claims, 9 Drawing Sheets

DEVICE FOR TRANSFERRING PRE-FORMED LAYERS OF OBJECTS TO THE TOP OF A PALLET

CROSS REFERENCE TO RELATED APPLICATIONS

This application is a National Stage of International Application No. PCT/FR2012/0052031 filed Sept. 12, 2012, claiming priority based on French Patent Application No. 11 58240, filed Sep. 15, 2011, the contents of all of which are incorporated herein by reference in their entirety.

FIELD OF THE INVENTION

The invention relates to palletizing systems.

The invention relates in particular to devices for transferring pre-formed layers of objects to the top of a pallet. Such devices, often called "palletizers," successively load layers of objects into a stack of layers atop a pallet, each object layer being previously shaped so as to be stackable.

The invention relates to devices having a reduced cycle time for such loading.

The term "preformed layers of objects to be transferred to the top of a standard pallet" is understood to mean a set of multiple objects arranged side by side, with adjacent objects being substantially in contact with and independent of each other. The largest dimension of the layer of objects is equal, or less than and substantially equal, to a standard dimension of the pallet. The main standards for pallets are 800×1200 mm in Europe and 1000×1200 in the U.S.

STATE OF THE ART

In 1983, document JP 58139926 described a stacking unit which comprises an upper slide and a lower slide on a column. The upper slide is equipped with a head that grasps the objects one by one, lifting the object by its ends and placing the object adjacent to an object previously loaded on the top of the pallet. The objects are thus transferred to the pallet before the pallet layer is formed. The lower slide is equipped with two horizontal bars designed for lifting a single object.

Such a stacking unit does not lie within the scope of the invention, as it is not suitable for transferring a pre-formed layer of objects to the top of a pallet. On the one hand, the lower slide is incapable of lifting a pre-formed layer of objects because the objects would fall between the bars. On the other hand, the head of the upper slide is incapable of loading a pre-formed layer of objects because they would fall during the transfer.

Such a stacking unit has a very slow stacking rate because there are as many capture and transfer cycles as there are objects in the layer of objects to be palletized. These multiple back-and-forth movements of the stacking unit are not only time-consuming but are also very energy inefficient, because all elements of the stacking unit must be in motion for each transferred object.

The field of the invention concerns the achievement of high palletizing speeds while increasing throughput and reducing energy consumption when stacking layers of objects on a pallet. Because of the standardization of pallet sizes, layer preparation devices have been developed which place the objects side by side in a configuration that optimizes the number of objects fitting on the surface of a standard pallet. Another device, located downstream, transfers the entire pre-formed layer of objects as a unit to the top of the pallet.

In the field of the invention, document EP 2243731 described, in 2009, a palletizer comprising two columns rotating about the same axis of rotation. Each column supports a tool, one of the tools depositing a layer while the other tool grasps another pre-formed layer. Each tool is mounted in a cantilevered manner on its own column. Such a palletizer reduces the time of one cycle by doubling the equipment. Such a palletizer has the disadvantage that the rotation of the tools and columns occupies space at the sides of the conveyor providing the pre-formed layers. In addition, doubling the equipment is costly.

Other types of palletizers load the pallets at a fixed height. It is the pallet that is progressively lowered as it is loaded. The disadvantage is that the pre-formed layer must be lifted, which increases the maintenance cost of the layer pre-forming equipment.

Document IT1273728 describes a palletizer comprising a gantry consisting of two columns connected by an arch. The palletizer comprises two elements: one an intermediate tray and the other a depositing structure. Each of these two elements extends between the two columns and has a side that is guided translationally along one of the columns. The opposite side of each of these elements is guided translationally along the other column. A disadvantage of such a palletizer is that the gantry interferes with access to the sides of said elements.

Documents EP 2112101 and WO 2010/086292 also describe palletizers.

OBJECT AND SUMMARY OF THE INVENTION

The invention proposes a device for transferring preformed layers of objects to the top of a pallet and a palletizing system which overcome at least one of the above disadvantages.

One aim of the invention is to improve accessibility around the layers to be palletized.

According to one embodiment, the device for transferring pre-formed layers of objects to the top of a standard pallet comprises:
  a guide column,
  a depositing head designed to deposit said layers on top of one another on the pallet, and
  a receiving tray for receiving a pre-formed layer of objects, said tray being movable relative to the depositing head.

The depositing head and the receiving tray are each slidably mounted in cantilever fashion only on said guide column.

The device comprises a drive means for advancing the pre-formed layer of objects from the receiving tray to a reference surface of the depositing head.

In other words, the palletizer has a single column. However, the palletizing system may include other columns for other elements associated with the palletizer. The fact that the receiving tray and the depositing head are both mounted in cantilever fashion on a single column leaves space for accessing all sides where there is no column. This allows other optional elements to be adjacent to the palletizer. In addition, it is much faster and less expensive to install a single-column palletizer than to install a gantry palletizer. In contrast to the two columns of the gantry which must be adjusted during installation, the single-column implementation arrives on site with all the sliding means already preset.

Advantageously, the drive means is designed to push the pre-formed layer of objects translationally.

According to one embodiment, the depositing head comprises a conveyor. The reference surface delimits the portion of an upper surface of the conveyor within which the layers can be positioned for depositing on the pallet.

Advantageously, the guide column is fixed to the ground and comprises a main translational guide means onto which are slidingly mounted a first carriage, to which the depositing head is connected, and a second carriage, to which the receiving tray is connected, the second carriage being located between the first carriage and the ground. In other words, the second carriage cannot move beyond the first carriage. This allows using the same guiding means for both carriages.

Advantageously, the depositing head is only movable translationally relative to the column, with no rotational component. Such a depositing head is much simpler, more robust, and less expensive than a head having a degree of rotational freedom.

Advantageously, the column is stationary relative to the ground. In other words, the column does not rotate about an axis, for example a vertical axis. The attachment of the column to the ground can be much more robust than if the column were mobile. The spatial positioning of the sliding means of the column is also more accurate.

According to one embodiment, the receiving tray is equipped with a conveyor presenting a conveying direction for said layers.

Advantageously, the device comprises a first wheel driving a first link coupled to the depositing head, and a second wheel driving a second link coupled to the receiving tray, the axis of rotation of the first drive wheel and/or the axis of rotation of the second drive wheel being parallel to the layer conveying direction. This characteristic allows easily placing a motor extending upstream and/or downstream (relative to the layer conveying direction) of the single column. This reduces the dimensions of the palletizer in the direction transverse to the layer conveying direction. The possibility of having this characteristic is a further advantage of the single-column palletizer. In contrast, in the gantry palletizer described in IT 1273728, a common shaft extends between the columns of the gantry, and synchronizes the sliding movement of the depositing head along the two columns. The motor for this common shaft also extends transversely, which is cumbersome.

Advantageously, the device comprises a flat surface for supplying a set of objects pre-formed into a layer intended to be transferred then placed on top of the pallet. The depositing head is mounted to move translationally along positions successively corresponding to each height of the layers to be deposited. The receiving tray is translationally movable from a height corresponding to the height of the layer supply surface, to a height corresponding to the current height of the depositing head. This makes it possible to perform multiple steps of the layer transfer process simultaneously and reduces the cycle time of the palletizer. The depositing head can remain at or near the top of the stack of layers already loaded on the pallet; the receiving tray can then shuttle between the layer supply surface and the depositing head while the depositing head is executing its depositing operations.

According to one embodiment, the depositing head has an insertion direction for a layer of objects.

Advantageously, the depositing head is open above the reference surface and/or at a side of the reference surface relative to the insertion direction. This provides access to the layer to be deposited when it is no longer moving. This allows, for example, placing a slip sheet on the layer to be deposited without having to secure it. This can advantageously be used when the objects forming the layer to be palletized are packs of containers enclosed in shrink-wrapped film.

Advantageously, the receiving tray is equipped with an end roller having a diameter of less than 40 mm, which is arranged so that it can be adjacent to the conveyor of the depositing head, without an intermediate connecting plate. This reduces the cycle time of the palletizer. It is then no longer necessary for the cycle to include a step of introducing an intermediate plate to ensure continuous support between the receiving tray and the conveyor of the depositing head.

According to one embodiment, the depositing head comprises a mechanism for supporting and driving the conveyor and designed to retract the conveyor, said mechanism comprising two lateral structures extending along each side of the conveyor relative to the insertion direction.

Advantageously, the device comprises a main arm connecting the depositing head to the guide column, an upstream secondary arm projecting from an anchor point on the main arm located upstream of the reference surface along the insertion direction, said upstream secondary arm being connected to upstream portions of the two lateral structures, the device further comprising a downstream secondary arm projecting from an anchor point on the main arm located downstream of the reference surface along the insertion direction, said downstream secondary arm being connected to downstream portions of the two lateral structures. This type of fastening for the mechanism for supporting and driving the conveyor allows opening the depositing head above and/or at the side of the reference surface. The main arm may be rigid and mounted in rectilinear translation along the single column.

In one variant, the main arm can be movable relative to the column in a combination of vertical and/or horizontal translational movements.

In another variant, the main arm may have a hinge for rotating about a vertical axis between the upstream anchor point and the column.

Advantageously, each lateral structure comprises a plate or a set of plates, vertical and parallel to the insertion direction and forming a U, the base of the U extending along the entire length of the reference surface. This improves accessibility to the layer of objects being deposited on top of the stack of palletized layers.

Advantageously, the device comprises longitudinal centering-tightening means which are guided within the lateral structures.

Another aspect of the invention relates to a palletizing system comprising:
  a layer transfer device such as the device described above,
  a layer preparation device arranged upstream of the receiving tray along the layer conveying direction.

Advantageously, the palletizing system comprises a pallet conveyor, adapted for transporting pallets that are oriented either lengthwise or widthwise relative to the pallet conveying direction, and a pallet dispensing device for dispensing pallets one at a time onto said pallet conveyor, said pallet dispensing device being adapted to accept either a stack of pallets oriented lengthwise relative to said conveying direction or a stack of pallets oriented widthwise.

A "pallet dispensing device," also referred to as a "pallet dispenser," means a device designed to supply pallets one at a time from a stack of pallets.

Such a palletizing system has the advantage of being able to palletize pre-formed rectangular layers of objects, whether the layers are oriented with their length parallel to the layer conveying direction or are oriented with their length perpendicular to the layer conveying direction. This flexibility allows optimizing object placement in the layers regardless of the object size. With the pallet dispenser able to receive stacks of pallets in either orientation, the palletizing system does not need to rotate the pre-formed layers by 90° before placing them on the pallet. This eliminates the energy required for such pivoting. This simplifies the palletizer and can reduce the cycle time.

Another aspect of the invention relates to a depositing head for depositing pre-formed layers of objects for palletizing, having an insertion direction for the object layers and comprising a conveyor having a reference surface delimiting the portion of the upper face of the conveyor within which the layers can be positioned for depositing, said depositing head being open above the reference surface and/or at a side of the reference surface relative to the insertion direction.

BRIEF DESCRIPTION OF THE DRAWINGS

The present invention will be better understood by examining the detailed description of some embodiments given by way of non-limiting example and illustrated in the accompanying drawings, in which.

DETAILED DESCRIPTION

Figure 1:
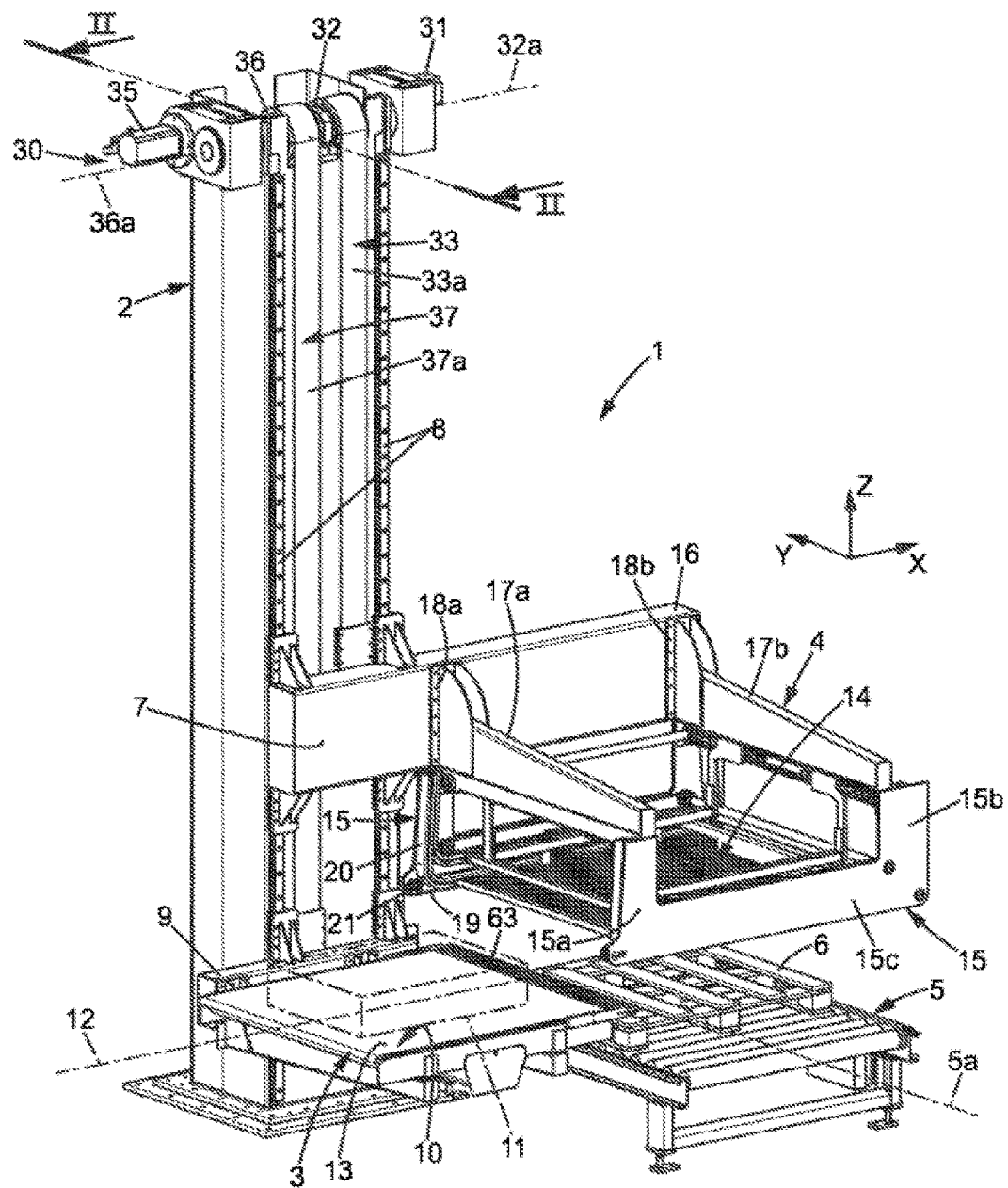
FIG. 1 is a perspective view of the palletizer.

As illustrated in FIG. 1, the layer transfer device, also called a palletizer 1, comprises a guide column 2, a receiving tray 3, a depositing head 4, and a pallet conveyor 5, here conveying a pallet 6 in a horizontal and transverse direction "y". The depositing head 4 is mechanically connected to a first carriage 7 mounted to slide translationally along a translational guide means such as, for example, a pair of rails 8. The rails 8 are parallel and run along the column 2 in a vertical direction "z".

The receiving tray 3 is mechanically connected to a second carriage 9 mounted to slide translationally along the same pair of rails 8. The receiving tray 3 comprises a conveyor 10 for conveying layers 11 of objects. In the example, the conveyor 10 consists of a rotating endless belt extending along a horizontal conveying plane 13 and driven by a motor in a conveying direction 12 for the pre-formed layers 11. The conveying direction 12 is parallel to a horizontal and longitudinal direction "x".

The guide column 2 comprises an elongate hollow body having a substantially rectangular horizontal cross-section where the length of the rectangle is oriented along direction "x". The guide rails 8 are anchored to the outside of the hollow body and near the corners of the rectangle of the cross-section, at each end of the longer side of this rectangle.

This allows the rails 8 to be set apart from each other. The guidance of the carriages 7 and 9 is thus optimized while maintaining the same inertia of the body of the guide column 2. In particular, this allows the first carriage 7 to support the double cantilever of the depositing head 4: the depositing head 4 is distanced from the guide column 2 not only in the transverse direction "y", but also in the longitudinal direction "x". This allows the first carriage 7 to hold the depositing head 4 above the pallet conveyor 5.

Figure 2:
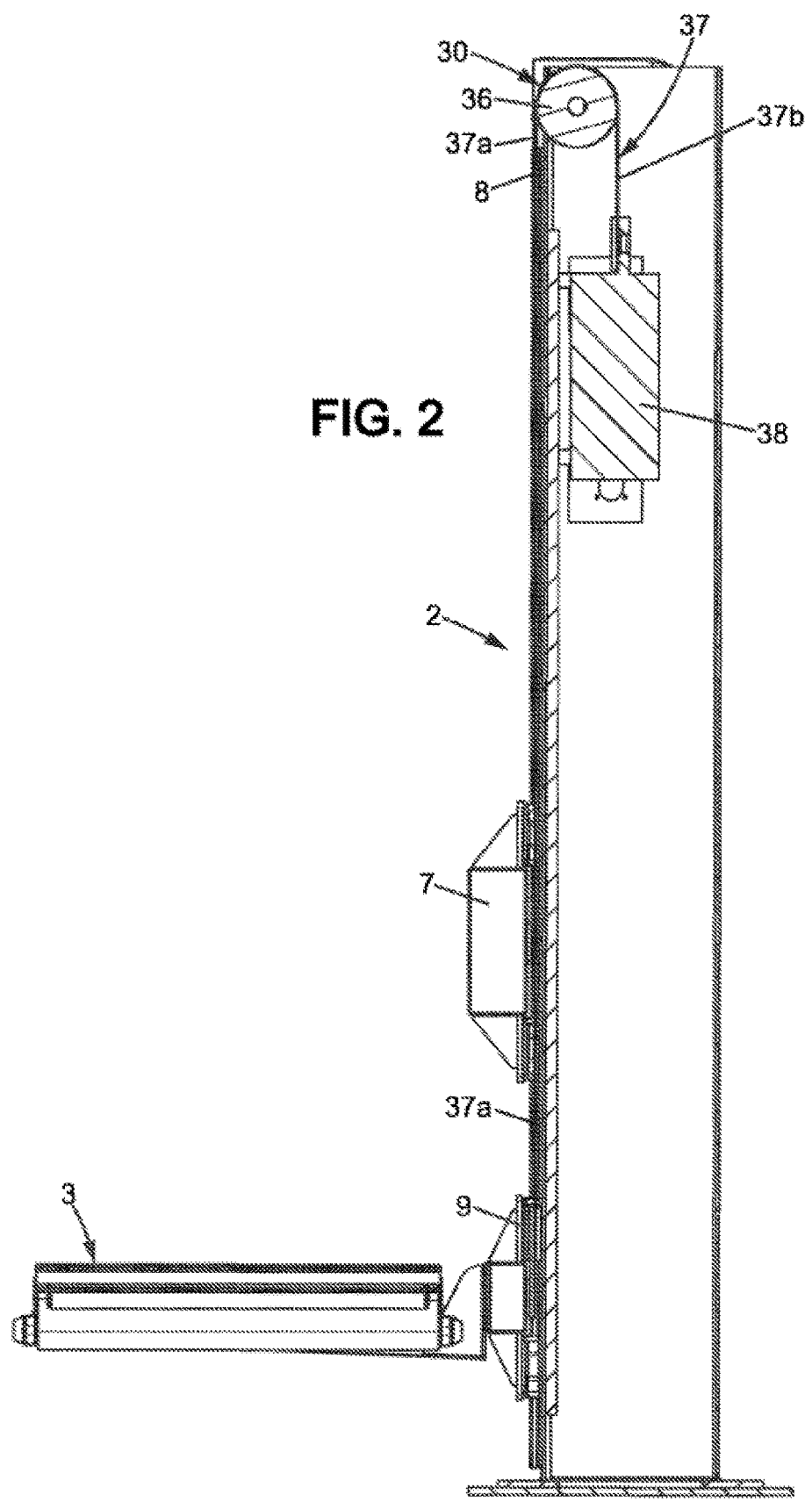
FIG. 2 is a cross-section along plane II-II of FIG. 1.

We will use FIGS. 1 and 2 to describe the drive means 30 for translationally moving the receiving tray 3 and the depositing head 4. Said means 30 comprise a first electric motor 31, driving a first drive wheel 32 via a reducing gear. The first wheel 32 drives a link 33 in the form of belt, preferably a flat and/or toothed belt, having an outer side 33a connected to the first carriage 7 and an inner side 33b connected to a first counterweight 34 (not visible in the figures, but referred to for better understanding of the description) corresponding to the weight of the first carriage 7 and depositing head 4 together.

Similarly, the drive means 30 comprise a second electric motor 35, driving a second drive wheel 36 via a reducing gear. The second wheel 36 drives a second link 37 in the form of a belt, preferably flat and/or toothed, having an outer side 37a connected to the second carriage 9 and an inner side 37b connected to a second counterweight 38 corresponding to the weight of the second carriage 9 and receiving tray 3. In fact, as is particularly visible in FIG. 1, the two links 33, 37 are arranged parallel to each other so that the inner side 33b of link 33 driven by the first motor 31 moves parallel to the inner side 37b of the second link 37 and substantially within the same plane as the inner side 37ba of the second link 37, and the first counterweight 34 is connected to the inner side 33b of link 33 in the same manner as the second counterweight 38 is connected to the inner side 37b of link 37. In other words, the first and second counterweights 34, 38 move along parallel paths inside the hollow body of the guide column 2. Thus, the energy consumed by the first and second motors 31, 35 is used primarily to overcome the inertia of the masses to be moved and to overcome friction.

In a particularly advantageous manner, the axis 32a of rotation of the first wheel 32 and/or the axis of rotation 36a of the second wheel 36 is parallel to the conveying direction 12 of the layers 11. Thus, the sides 33a, 33b and/or 37a, 37b may have an elongated cross-section along longitudinal axis "x". This gives the entire assembly of the translational drive means 30 particularly small dimensions in the direction transverse to the conveying direction 12. This allows the palletizer 1 to be particularly compact.

The outer sides 33a, 37a of the belts are located between the two guide rails 8. This improves the transverse compactness of the palletizer 1.

Advantageously, the first and second drive wheels 32, 36 are located at or near the upper end of the guide column 2. This allows the drive means 30 to function without a guide pulley and allows having links 33, 37 that do not form a closed loop. This reduces the number of drive components required.

The guide column 2 further comprises, inside the hollow body, guides extending along the column 2 in order to guide the vertical movements of the first and second counterweights 34, 38 alongside each other but without colliding. In addition, this uses the body of the guide column 2 as a protective shield between the counterweights and the operator.

Figure 3:
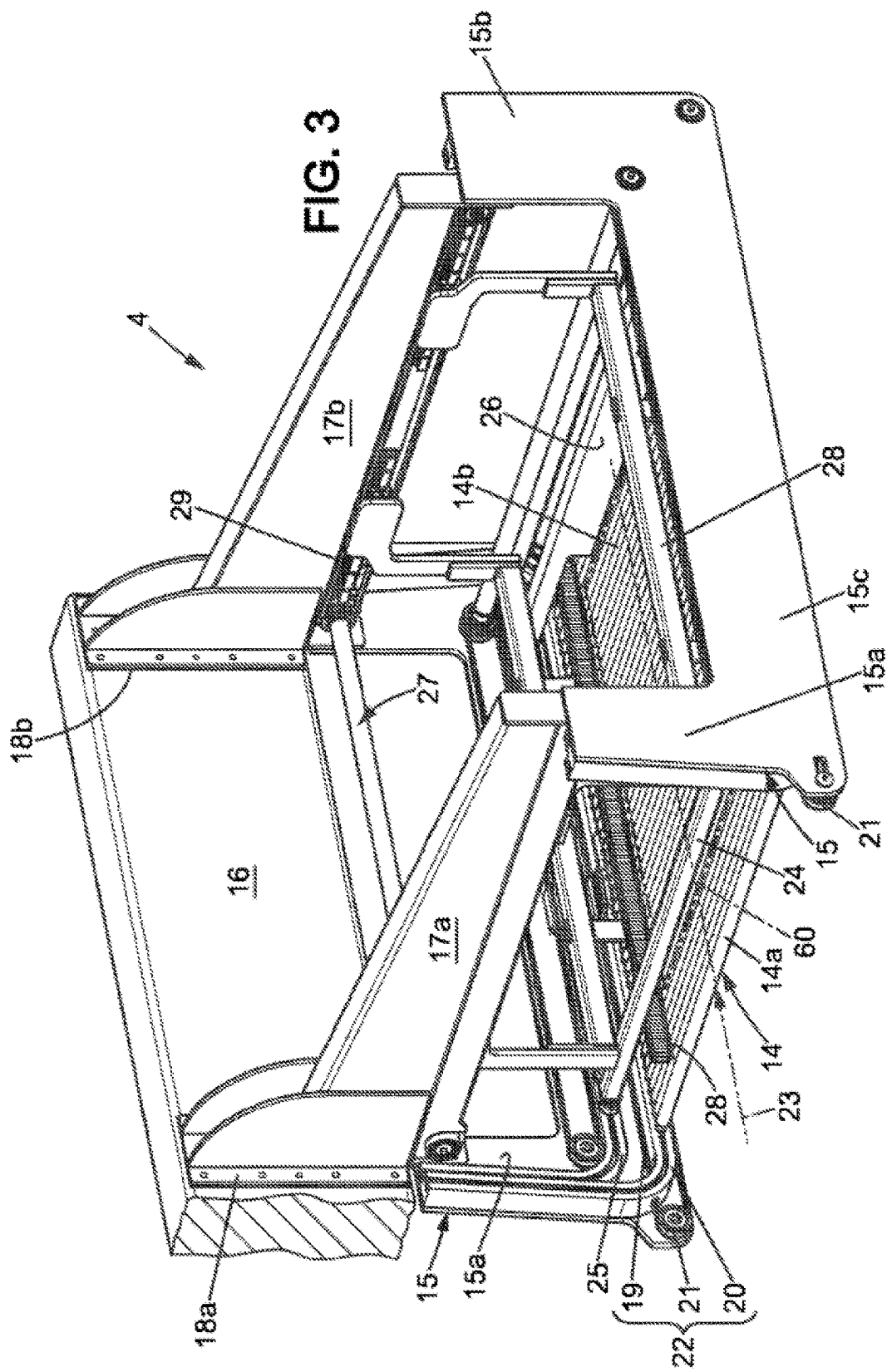
FIG. 3 is a perspective view of the depositing head.

As illustrated in FIG. 3, the depositing head 4 comprises a roller conveyor 14 extending in a horizontal plane along an insertion direction 23 which is parallel to the layer conveying direction 12.

The depositing head includes a reference surface 60 at the center of the conveyor 14 in the closed state, which defines the maximum surface area that can receive a layer 11 (see below).

The conveyor 14 is composed of freely rotating rollers. The axis of rotation of each roller is perpendicular to the insertion direction 23 of the layers 11 of objects. The conveyor 14 is composed of an upstream half-conveyor 14a located on the receiving tray 3 side, and a downstream half-conveyor 14b located on the opposite side.

The depositing head 4 comprises two vertical lateral structures 15, formed by plates in the shape of a U. Each of said side plates 15 comprises an upstream portion 15a extending upwards and located on the receiving tray 3 side, a downstream portion 15b extending upwards and located on the opposite side, and a main portion 15c extending horizontally between the upstream 15a and downstream 15b portions.

The depositing head 4 comprises a main arm 16 extending parallel to the insertion direction 23, out from the first carriage 7. The depositing head 4 comprises a secondary upstream arm 17a, projecting transversely from the main arm 16 from an upstream anchor point 18a. The upstream anchor point 18a is located upstream of the reference surface 60. The upstream secondary arm 17a is connected to the upper ends of the upstream portions 15a of the two U-shaped plates 15. Similarly, the depositing head 4 comprises a downstream secondary arm 17b, projecting transversely from the main arm 16 from a downstream anchor point 18b. The downstream anchor point 18b is located downstream of the reference surface 60. The downstream secondary arm 17b is connected to the upper ends of the downstream portions 15b of the two side plates 15.

Each of the two half-conveyors 14a and 14b is pulled by two lateral retraction belts 19 along two retraction half-rails 20, in a manner similar to a roller blind. The four half-rails 20 and the drive pulleys 21 for the belts 19 are mounted on the corresponding side plates 15, and together with said plates 15 form a mechanism 22 for supporting and driving the conveyor 14. The plates 15 are the lateral structures 22 of this mechanism.

The depositing head 4 further comprises an upstream retractable stop 24, extending transversely above the upstream half-conveyor 14a in the non-retracted state. The upstream stop 24 is slidably mounted in two lateral runners 25 and is driven by a chain so as to be movable along the insertion direction 23 and upwardly retractable. The depositing head 4 comprises a downstream stop 26 extending transversely above the downstream half-conveyor 14b in the non-retracted state. The downstream stop 26 is movable along the insertion direction 23. The upstream stop 24, downstream stop 26, and runners 25 together constitute the longitudinal centering/tightening means 24-25-26 which are guided by the two lateral structures 15. When retracted, the two half-conveyors 14a, 14b are spaced apart from one another and are raised inside the vertical ends of the runners 20. In other words, the conveyor 14 opens like a hatch and allows the layer 11 which is retained by the upstream 24 and downstream 26 stops to drop.

The depositing head 4 comprises transverse centering/tightening means 27 comprising two lateral rods 28 extending longitudinally and each moved symmetrically relative to a vertical and longitudinal center plane containing the insertion direction 23. Said transverse centering/tightening means 27 comprise a runner and belt mechanism 29 integrated into each secondary arm 17a, 17b.

Figure 4:
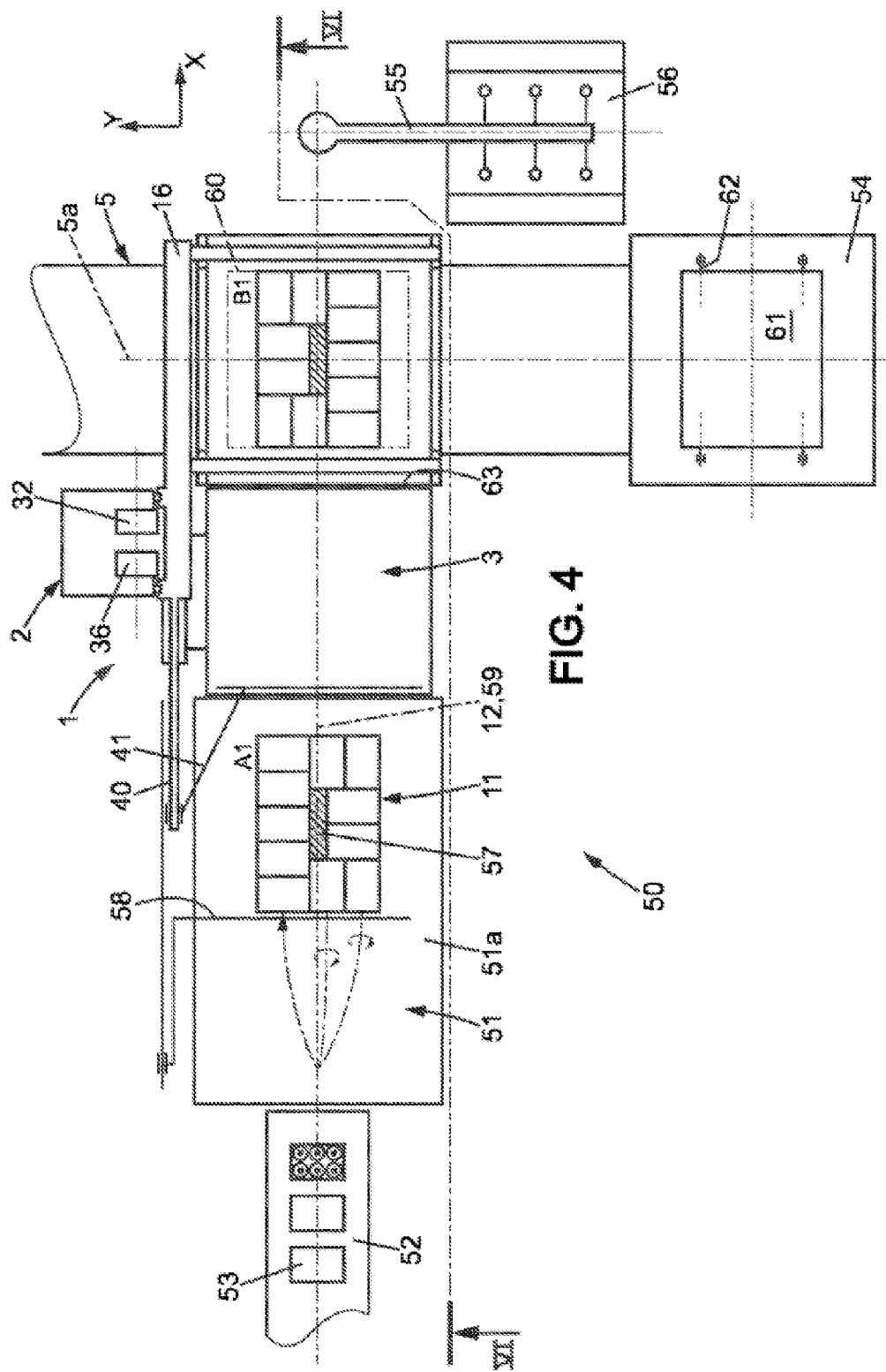
FIG. 4 is a schematic top view of a palletizing system used for palletizing layers of objects oriented longitudinally.
Figure 5:
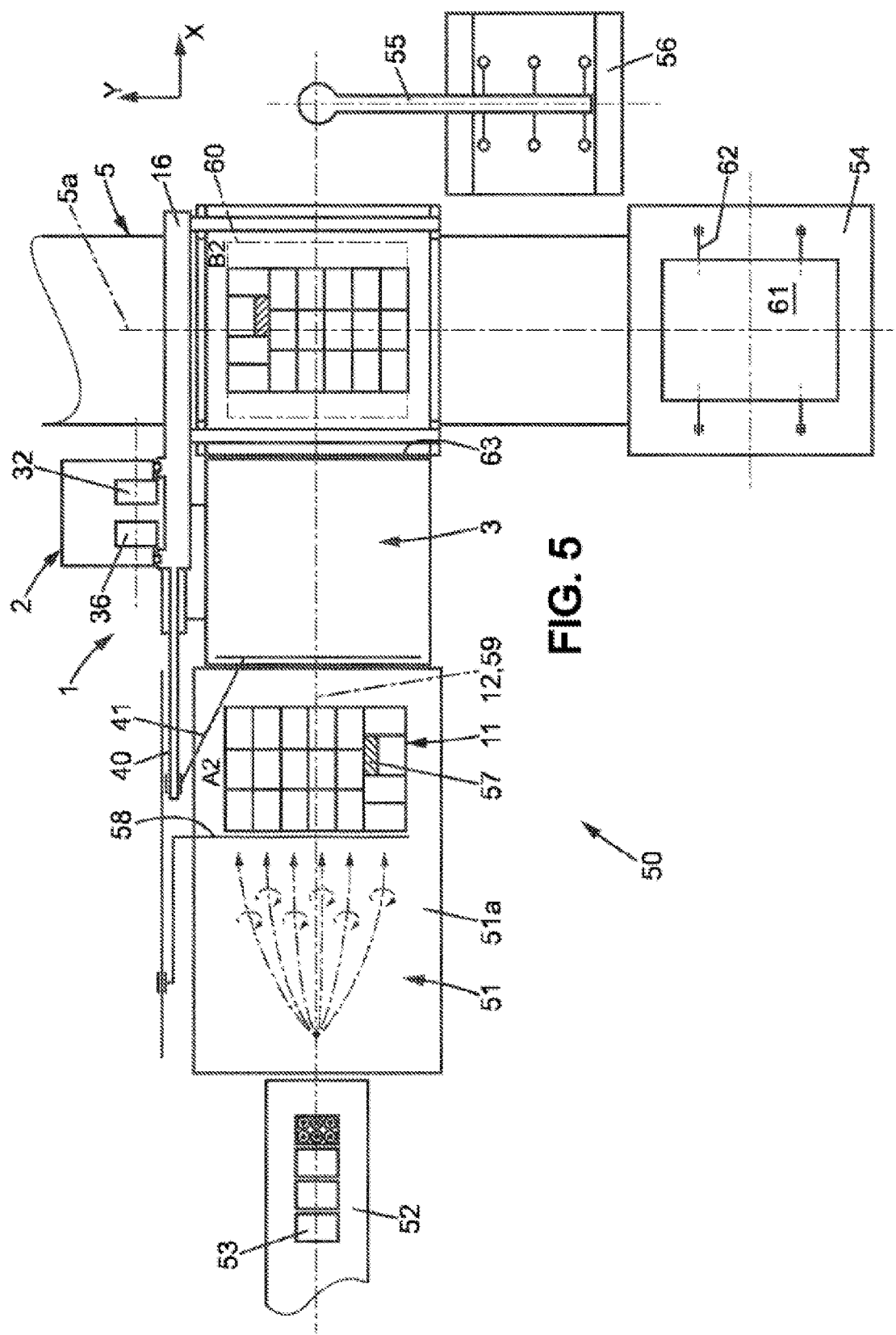
FIG. 5 is a schematic top view of the palletizing system of FIG. 4 but used for palletizing layers of objects oriented transversely.

We will now refer to FIGS. 4 and 5 to describe a palletizing system 50 that includes, in addition to the previously described palletizer 1 and the pallet 6 conveyor 5, a layer 11 preparation device 51 arranged upstream of the receiving tray 3 along the layer 11 conveying direction 12, a single line conveyor 52 for objects 53 which is arranged upstream of the device 51, and a pallet 6 dispenser 54 arranged upstream of the pallet conveyor 5 along the pallet 6 conveying direction 5a.

The palletizing system 50 may optionally include an arm 55 for supplying slip sheets 56.

The objects 53 to be palletized are typically individual packs occupying a substantially rectangular volume. These individual packs 53 comprise, for example, cans or bottles, for example in groups of six as illustrated, held rigidly together by shrink-wrapped film. The packs 53 may alternatively consist of any objects resistant to vertical pressure and grouped in a box that is also substantially rectangular.

It is understood that the purpose of palletizing is to deposit the maximum amount of individual packs 53 on a pallet layer 11. Let us call the horizontal length and width of an individual pack "l" and "w" respectively. The pallets 6 are generally rectangular and of standard dimensions, for example, 800×1200 mm in Europe and 1000×1200 mm in the U.S. Let us call the length and width of the pallets 6 "L" and "W" respectively. The number of packs 53 that can be placed in a layer 11 substantially corresponds to the integer part of the ratio (LW)/(lw). There is usually a non-usable space 57 that remains.

The layer 11 preparation device 51 receives the packs 53 from the single line conveyor 52 and routes certain packs along a path 53 without pivoting them, and routes others while pivoting them 90° about a vertical axis, doing so in order to achieve a generally rectangular arrangement in which the packs 53 are placed side by side. The arrangement of the packs 53 is such that the layer 11 of objects can be pushed by a pusher arm 58 without ruining the shape of the layer, meaning without the objects 53 entering the unused space 57.

FIG. 4 illustrates a first type of layer arrangement in which only the longitudinal orientation of the layer 11 prevents this layer from being deformed by the action of the pusher arm 58. This longitudinal arrangement is one where the length of the rectangle of the layer 11 is parallel to the conveying direction 12.

FIG. 5 illustrates a second type of layer arrangement, in which only the transverse orientation of the layer 11 prevents this layer from being deformed by the action of the pusher arm 58. This transverse arrangement is such that the length of the rectangle of the layer 11 is perpendicular to the conveying direction 12. For each of the two types of arrangements (longitudinal or transverse), there are two corresponding arrangements A, B that are symmetrical to each other relative to a plane of symmetry 59, said plane 59 extending vertically and containing the conveying direction 12.

Optimizing the arrangement of the layer 11 of objects 53 requires that the palletizing system 60 be able to stack layers 11 which are oriented either longitudinally or transversely.

The reference surface 60 of the depositing head 4 is square, for example 1300×1300 mm in size. Thus, the reference surface 60 is able to receive the layers 11 whether they are oriented transversely or longitudinally. Regardless of whether the longitudinal configuration (FIG. 4) or the transverse configuration (FIG. 5) is used, the first step is to bring the pre-formed layer 11 from the layer preparation device 51 to the receiving tray 3, for example via the action of the pusher arm 58.

In a second step, the palletizer 1 brings the layer 11 from the receiving tray 3 to the reference surface 60 by the drive means 40, which was not illustrated in FIGS. 1 to 3 and which is functionally represented in the other figures as an extension of the main arm 16 which advances a pusher 41 translationally.

In a third step, the upstream 24 and downstream 26 stops, as well as the transverse centering/tightening means 27 (see FIG. 3) center the layer 11 at the center of the reference surface 60, regardless of whether this layer 11 is in the longitudinal or transverse orientation.

In a fourth step, the retraction of the roller conveyor 14 deposits the rectangular layer 11 on a rectangular and similarly oriented pallet 6.

The pallet dispenser 54 of the palletizing system 50 is arranged to receive stacks 61 of pallets 6 in which all the rectangular pallets have their lengthwise orientation either perpendicular or parallel to the pallet 6 conveying direction 5a. The pallet dispenser 54 has retractable fingers 62 that are sufficiently long to retain the entire stack 61 of pallets regardless of the orientation of the stack 61.

For a given size l.w of objects 53 to be palletized, an optimal arrangement of the layers 11 is determined. Then, the layer 11 preparation device 51 is programmed for the arrangement to be implemented. If this optimal arrangement is longitudinal (FIG. 4), the operator inserts a stack 61 of pallets 6 that are all oriented with their length perpendicular to the pallet 6 conveying direction 5a and parallel to the layer 11 conveying direction 12. The layer 11 preparation device 51 then produces a succession of layers 11, all of the same longitudinal type and alternating so that two successive layers 11 have arrangements A1, B1 that are symmetrical to each other relative to the plane 59 of symmetry. Similarly, if the optimal arrangement is transversal (FIG. 5), the operator inserts a stack 61 of pallets 6 that are all oriented with their length parallel to the pallet conveying direction 5a and perpendicular to the layer 11 conveying direction 12. The layer preparation device 51 then produces a succession of layers 11, all of the same transverse type and alternating so that two successive layers 11 have arrangements A2, B2 that are symmetrical to each other relative to the plane 59 of symmetry.

It is understood that such a palletizing system 50 is flexible so as to adapt to any type of object to be palletized 53 without requiring rotation of the pre-formed layers 11. Such a palletizing system 50 is both simpler, because it has no means for rotating the layers 11, and more economical, because there is no kinetic energy of rotation to be communicated to the pre-formed layers 11.

Optionally, if the packs 53 consist of containers held together by shrink-wrapped film, the bottom of each of the packs 53 is generally not flat. Arm 55 supplies a slip sheet 56 between two successive layers 11. This prevents the containers from sliding horizontally relative to each other. This gives cohesion to the stack of palletized layers 11. This optional step is performed in a very simple manner and during time concurrent with the phase of longitudinal and transverse centering/tightening. Having an open top and front of the depositing head 4 allows inserting a slip sheet without increasing the cycle time of the palletizing system 50.

We will now, with the aid of FIGS. 6-9, describe the process of transferring pre-formed layers 11 of objects 53 from the layer 11 preparation device 51 to the pallet 6.

Figure 6:
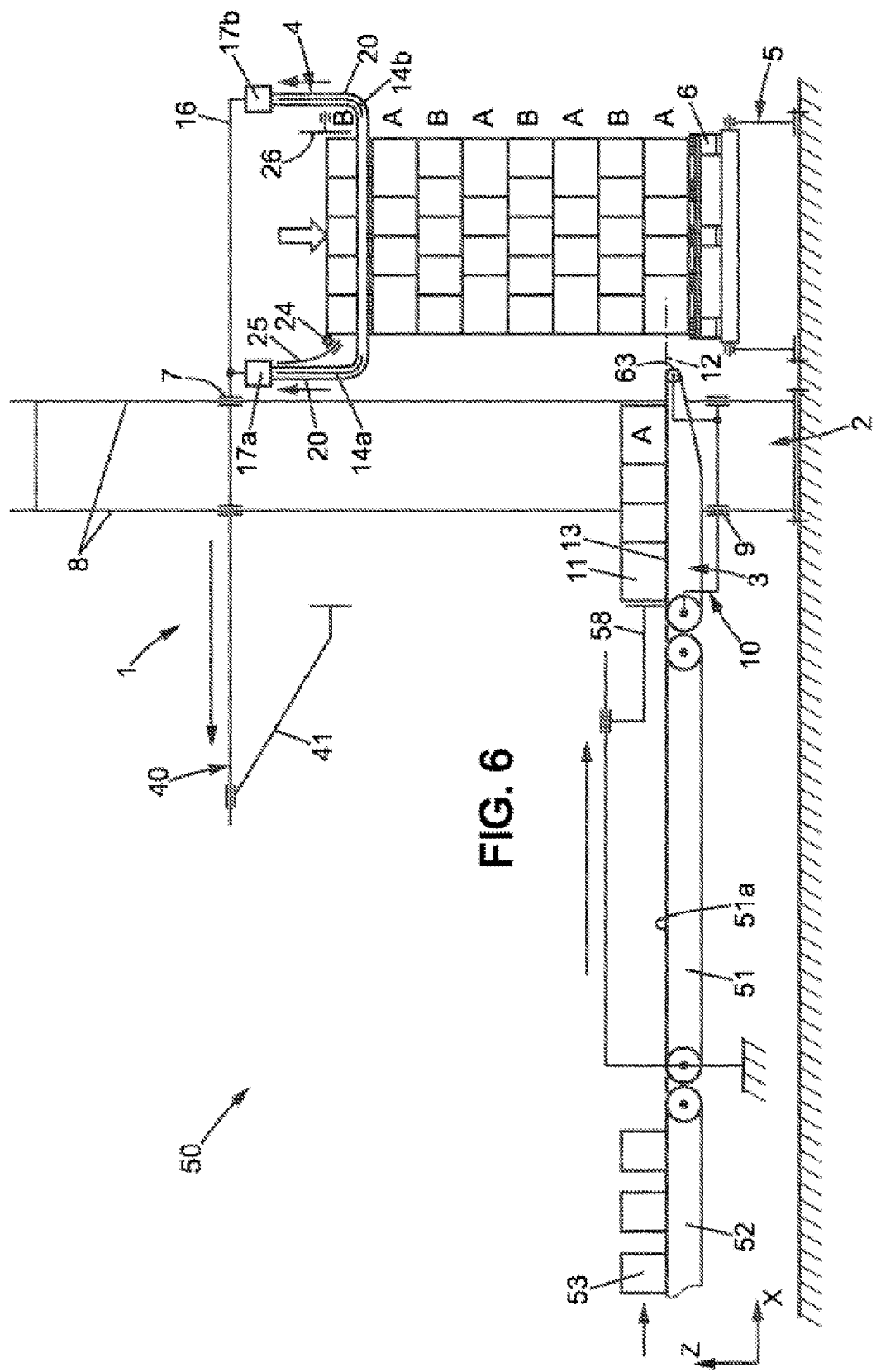
FIGS. 6-9 are cross-sectional diagrams of a palletizing system along plane VI-VI of FIG. 4, respectively illustrating a phase of depositing a layer, a phase of supplying of a new layer, a phase of insertion into the depositing head, and a phase of centering-tightening the layer.

FIG. 6 illustrates the palletizer 1 at the moment when the depositing head 4 has just deposited a previous layer 11 having an arrangement A. In this situation, the two half-conveyors 14a, 14b are retracted along the lateral retraction runners 20 and the upstream stop 24 is still in place. The receiving tray 3 is positioned so that the conveying plane 13 of the conveyor 10 is aligned with the layer supply surface 51a of the layer preparation device 51.

In a first step, the pusher arm 58 of the device 51 pushes the next layer 11 onto the receiving tray 3, said layer 11 having an arrangement B that is symmetrical to the arrangement A of the previous layer 11.

Figure 7:
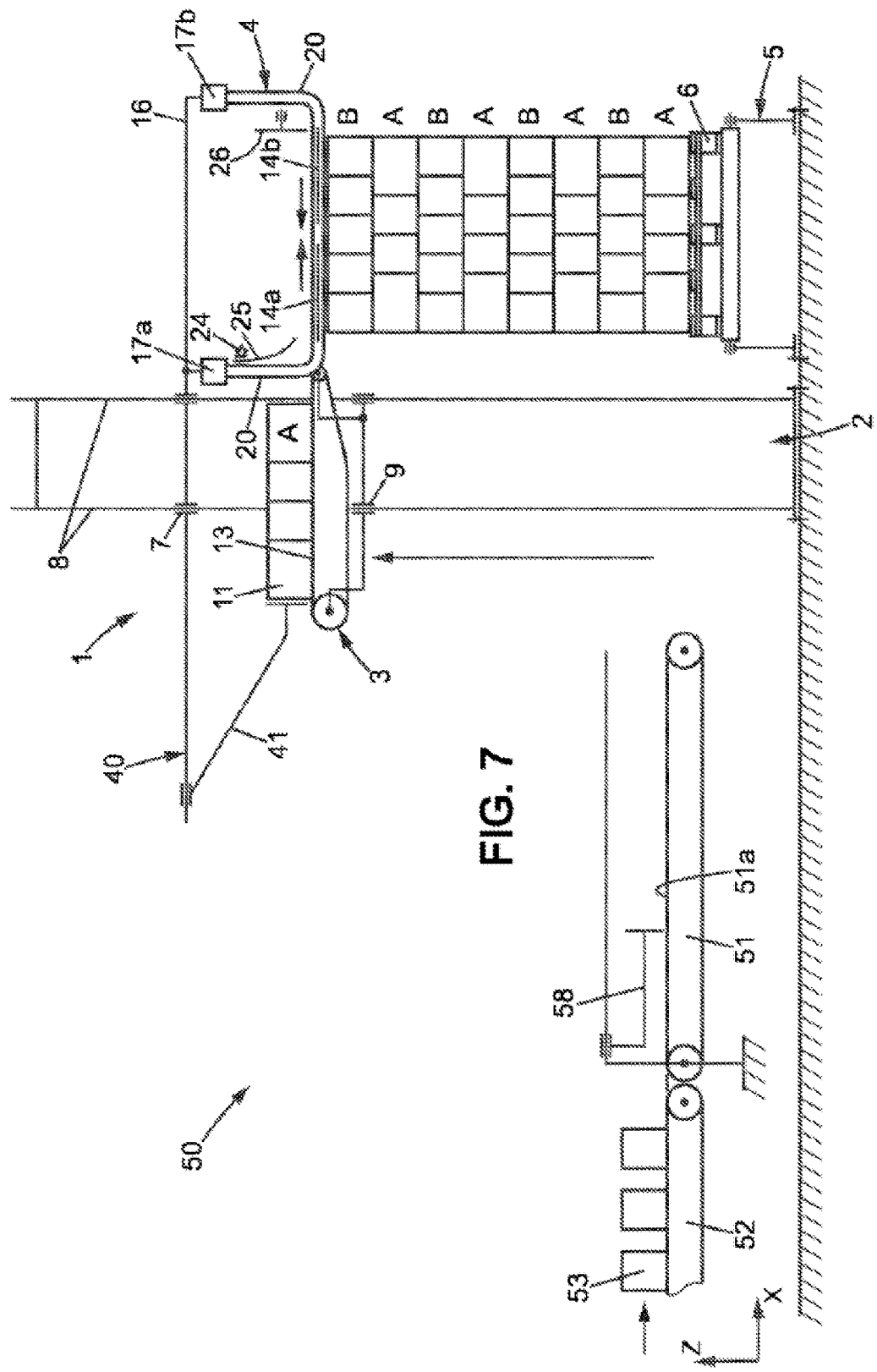

In a second step illustrated in FIG. 7, the depositing head 4 is raised to a height immediately above the previously deposited layer 11. In a third step, the two half-conveyors 14 of freely rotating rollers are returned to their place and the upstream stop 24 is simultaneously raised to a height greater than the thickness of the layers 11 so that the depositing head 4 can receive the new layer 11. Concurrently with the second and/or third step, the pusher arm 58 is withdrawn to be clear of the receiving tray 3. Said tray is then moved vertically so that the conveying plane 13 is aligned with the roller conveyor 14. If the plane of the pallet 6 is below the supply surface 51a of the layer 11 preparation device 51, the movement mentioned above for the receiving tray 3 can be downward as long as the level of the already-deposited layers 11 has not reached the level of the device 51. Otherwise, the above-mentioned movement is upwards.

Figure 8:
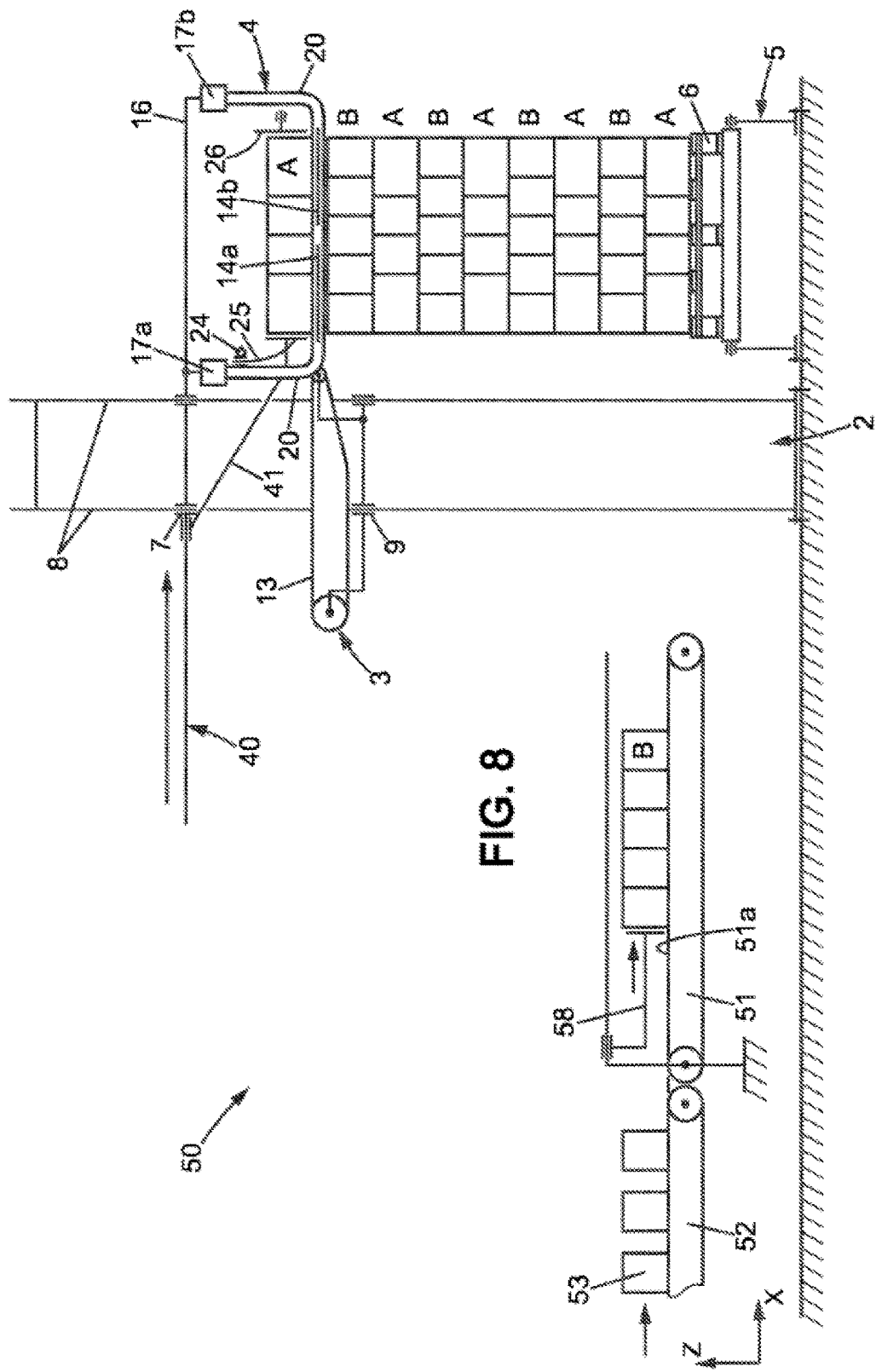

In a fourth step illustrated in FIG. 8, the pusher arm 41 of the depositing head 4 pushes the new layer 11 from the receiving tray 3 to the roller conveyor 14. A variant of the palletizer 1 may comprise any other means of transferring the layer 11 from the receiving tray 3 to the reference surface 60. During this time, the preparation device 51 has prepared the next layer 11.

Figure 9:
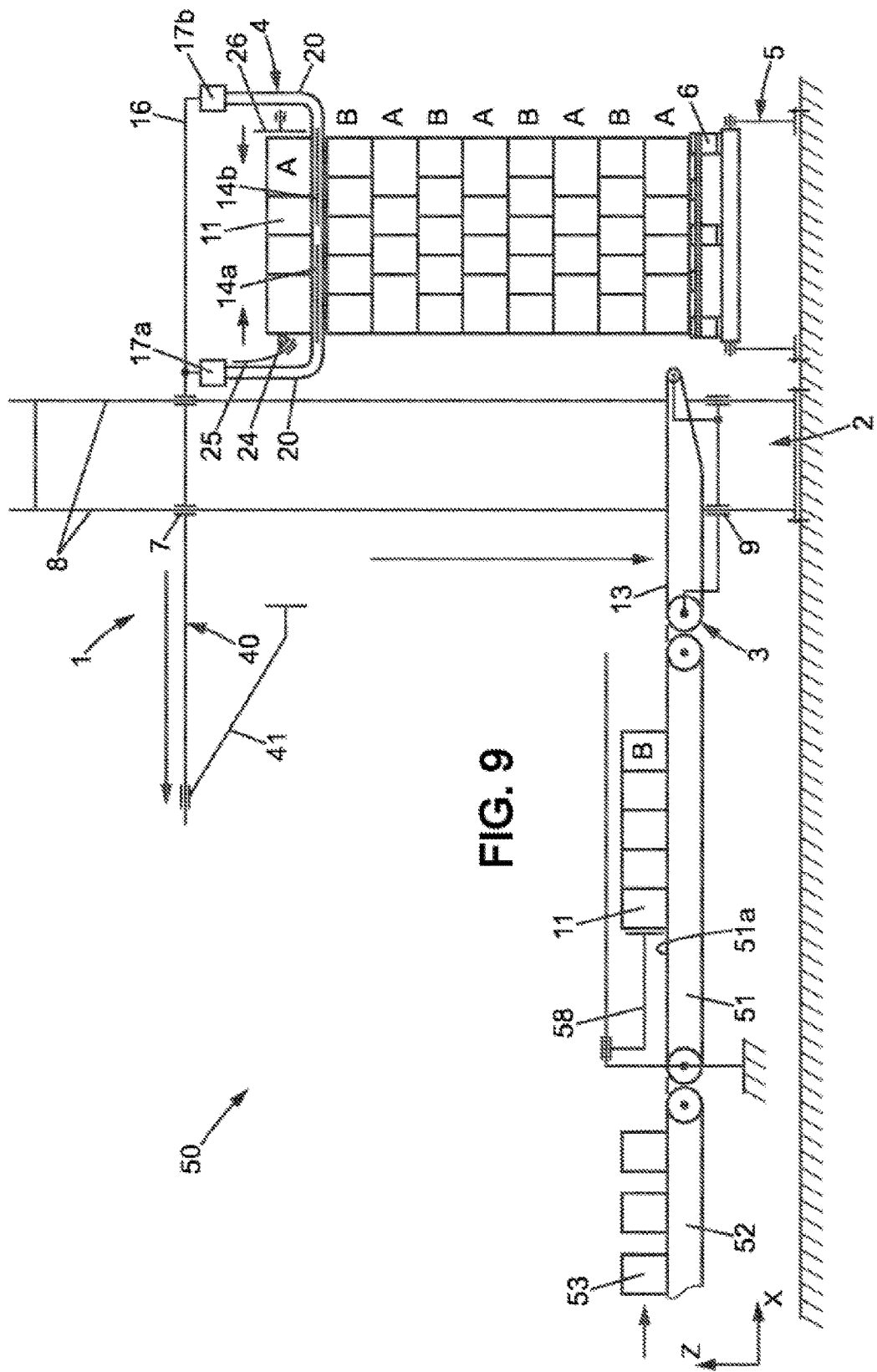

In a fifth step illustrated in FIG. 9, the pusher arm 41 is retracted and the upstream stop 24 returns to the level of the new layer 11 to be deposited. In a sixth step, the upstream 24 and downstream 26 stops are moved longitudinally to tighten-center the layer 11 longitudinally. The transverse tightening/centering means 27 may be operated simultaneously during the longitudinal tightening-centering. In a seventh step, the two half-conveyors 14a, 14b are retracted in their respective longitudinal directions while the upstream 24 and downstream 26 stops retain the new layer 11 longitudinally, and said layer is then deposited on the previous one. During the fifth and/or sixth and/or seventh step, the receiving tray 3 returns to the level of the supply surface 51a providing the future layers 11.

It is understood that the presence of the receiving tray 3 allows completing the upward and downward movements of the receiving tray 3 in parallel with the steps specific to the depositing head 4. This concurrent task completion greatly reduces the palletizing cycle time.

As illustrated in FIGS. 1, 7, 8 and 9, the receiving tray 3 is equipped with at least one end roller 63 having a diameter of less than 40 mm and placed horizontally so as to be adjacent to the conveyor 14 when the receiving tray 3 is at a height corresponding to the depositing head 4. As shown in FIG. 7, the lifting of the receiving tray 3 is actuated so as to finish after and close to the end of the return of the conveyor 14 to its position. Similarly, as shown in FIGS. 8 and 9, the retraction of the conveyor 14 is actuated so as to begin after and close to the beginning of the descent of the receiving tray 3. This synchronization avoids the need for an additional step of placing a connecting plate between the receiving tray 3 and the conveyor 14. This further reduces the palletizing cycle time.

The invention claimed is:

1. A device for transferring pre-formed layers of objects to the top of a standard pallet, comprising:
   a guide column,
   a depositing head designed to deposit said layers on top of one another on the pallet, and
   a receiving tray for receiving a pre-formed layer of objects, said receiving tray being movable relative to the depositing head,
   wherein the depositing head and the receiving tray are each slidably mounted in cantilever fashion only on said guide column, and wherein the device further comprises means for advancing the pre-formed layer of objects from the receiving tray to a reference surface of the depositing head; and
   wherein the device for transferring pre-formed layers of objects to the top of a standard pallet further comprises:
   a layer preparation device for preparing layers, arranged upstream of the receiving tray along a layer conveying direction;
   a pallet conveyor adapted for transporting pallets; and
   a pallet dispensing device for dispensing pallets one at a time onto said pallet conveyor.

2. The device according to claim 1, wherein the means for advancing the pre-formed layer of objects is designed to push the pre-formed layer of objects translationally.

3. The device according to claim 2, wherein the receiving tray is equipped with an end roller having a diameter of less than 40 mm, said roller being arranged so that said roller can be adjacent to the conveyor of the depositing head.

4. The device according to claim 2, wherein the depositing head comprises a mechanism for supporting and driving the conveyor and designed to retract the conveyor, said mechanism comprising two lateral structures extending along each side of the conveyor relative to the direction for inserting the pre-formed layer of objects into the depositing head.

5. The device according to claim 4, comprising a main arm connecting the depositing head to the guide column, an upstream secondary arm projecting from an anchor point on the main arm located upstream of the reference surface along the insertion direction, said upstream secondary arm being connected to upstream portions of two lateral structures, the device further comprising a downstream secondary arm projecting from an anchor point on the main arm located downstream of the reference surface along the insertion direction, said downstream secondary arm being connected to downstream portions of the two lateral structures.

6. The device according to claim 4, wherein each lateral structure comprises a plate or a set of plates, vertical and parallel to the insertion direction and forming a U, the base of the U extending along the entire length of the reference surface; and/or wherein the device comprises means for longitudinal centering-tightening which are guided within the lateral structures.

7. The device according to claim 1, wherein the depositing head comprises a conveyor, and wherein the reference surface delimits the portion of an upper surface of the conveyor within which the layers can be positioned for depositing on the pallet.

8. The device according to claim 7, wherein the receiving tray has a conveying plane, and wherein the means for advancing the pre-formed layer of objects is actuated when the conveying plane is aligned with the conveyor.

9. The device according to claim 1, wherein the depositing head is only movable translationally relative to the column, with no rotational component, and/or wherein the column is stationary relative to the ground.

10. The device according to claim 1, wherein the receiving tray is equipped with a conveyor presenting a conveying direction for said layers, the device comprising a first wheel driving a first link coupled to the depositing head, and a second wheel driving a second link coupled to the receiving tray, the axis of rotation of the first drive wheel and/or the axis of rotation of the second drive wheel being parallel to the conveying direction for the layers.

11. The device according to claim 1, comprising a supply surface for supplying a set of objects pre-formed into a layer intended to be transferred then placed on top of the pallet; the depositing head being mounted to move translationally along positions successively corresponding to each height of the layers to be deposited, the receiving tray being translationally movable from a height corresponding to the height of the supply surface to a height corresponding to the current height of the depositing head.

12. The device vice according to claim 1, wherein the depositing head is open above the reference surface and/or at a side of the reference surface relative to the direction for inserting the pre-formed layer of objects into the depositing head.

13. The device according to claim 1, wherein the receiving tray and the reference surface each have a surface area comprising a rectangle of 800×1200 mm.

14. The system according to claim 1, wherein said pallet conveyor is adapted for transporting pallets that are oriented either lengthwise or widthwise relative to the pallet conveying direction, and wherein said pallet dispensing device is adapted to accept either a stack of pallets oriented lengthwise relative to said conveying direction or a stack of pallets oriented widthwise.

15. A device for transferring pre-formed layers of objects to the top of a standard pallet, comprising:
   a guide column having a common rail,
   a depositing head designed to deposit the pre-formed layers on top of one another on the pallet;
   a receiving tray for receiving the pre-formed layers of objects one layer at a time, the receiving tray being movable relative to the depositing head; and
   a drive;
   wherein the depositing head and the receiving tray are each slidably mounted on the common rail in cantilever fashion, with the depositing head mounted to the common rail at a position that remains above a position where the receiving tray is mounted to the common rail; and wherein the drive in turn advances the pre-formed layer of objects from the receiving tray to a reference surface of the depositing head; and
   wherein the device further comprises a layer preparation device configured to sequentially form pre-formed layers of objects, in which for each layer the objects are arranged side by side, with adjacent objects being substantially in contact with and independent of each other; and a conveyor that transfers each pre-formed layer of objects from the layer preparation device to the receiving tray.

16. A device for transferring pre-formed layers of objects to the top of a standard pallet, comprising:
   a guide column, a depositing head designed to deposit said layers on top of one another on the pallet, and a receiving tray for receiving a pre-formed layer of objects, said receiving tray being movable relative to the depositing head, wherein the depositing head and the receiving tray are each slidably mounted in cantilever fashion only on said guide column, and wherein the device further comprises means for advancing the pre-formed layer of objects from the receiving tray to a reference surface of the depositing head;

wherein the receiving tray is equipped with a conveyor presenting a conveying direction for said layers, the device comprising a first wheel driving a first link coupled to the depositing head, and a second wheel driving a second link coupled to the receiving tray, the axis of rotation of the first drive wheel and/or the axis of rotation of the second drive wheel being parallel to the conveying direction for the layers.

17. A device for transferring pre-formed layers of objects to the top of a standard pallet, comprising:

a guide column, a depositing head designed to deposit said layers on top of one another on the pallet, and a receiving tray for receiving a pre-formed layer of objects, said receiving tray being movable relative to the depositing head, wherein the depositing head and the receiving tray are each slidably mounted in cantilever fashion only on said guide column, and wherein the device further comprises means for advancing the pre-formed layer of objects from the receiving tray to a reference surface of the depositing head;

wherein the means for advancing the pre-formed layer of objects is designed to push the pre-formed layer of objects translationally; and wherein the receiving tray is equipped with an end roller having a diameter of less than 40 mm, said roller being arranged so that said roller can be adjacent to the conveyor of the depositing head.

* * * * *